Feb. 18, 1941.  A. BOYNTON  2,231,878
THREADLESS DRILL STEM
Filed Sept. 22, 1938  3 Sheets-Sheet 1

ALEXANDER BOYNTON, INVENTOR,
BY
ATTORNEYS.

Feb. 18, 1941.   A. BOYNTON   2,231,878
THREADLESS DRILL STEM
Filed Sept. 22, 1938   3 Sheets-Sheet 2

ALEXANDER BOYNTON,
INVENTOR,

BY Jesse R. Stone
& Lester B. Clark
ATTORNEYS

ALEXANDER BOYNTON, INVENTOR,

BY *Jesse R. Stone* & *Lester B. Clark*
ATTORNEYS.

Patented Feb. 18, 1941

2,231,878

UNITED STATES PATENT OFFICE 2,231,878

THREADLESS DRILL STEM

Alexander Boynton, San Antonio, Tex.

Application September 22, 1938, Serial No. 231,209

8 Claims. (Cl. 285—161)

My invention relates to rotary drill pipe and, particularly, to a threadless method and means for connecting the joints thereof together, as well as a method and means for connecting all other pipe, shafts, and the like.

The principal objects are: (1) to provide a threadless means for connecting the joints together, (2) to enable the drill pipe to be rotated either clockwise or anti-clockwise without danger of the joints becoming disconnected, (3) to connect the joints in such manner as to eliminate compression strains upon the male members and expansion strains upon the female members, (4) to minimize crystallization, (5) to eliminate galling of the mating parts, (6) to provide greater strength than threads afford, (7) to prevent leakage between the male and female members by employing separate replaceable means for that purpose, (8) to eliminate the use of tool joints, (9) to provide for greater speed going in and coming out of the hole than can be obtained by employing threaded connections, and, (10) to provide greater safety for employees on drilling rigs.

By employing removable keys and keyways mating therewith, one-half of the keys and mating keyways inclining in one direction between the male and female members and the other half of them inclining in the opposite direction supplemented by replaceable automatically expanding packing, I attain all of the foregoing objects, as will more clearly appear from the following specification and accompanying drawings in which—

Similar characters of reference are employed to refer to similar parts throughout the several views of each embodiment.

Figure 2:
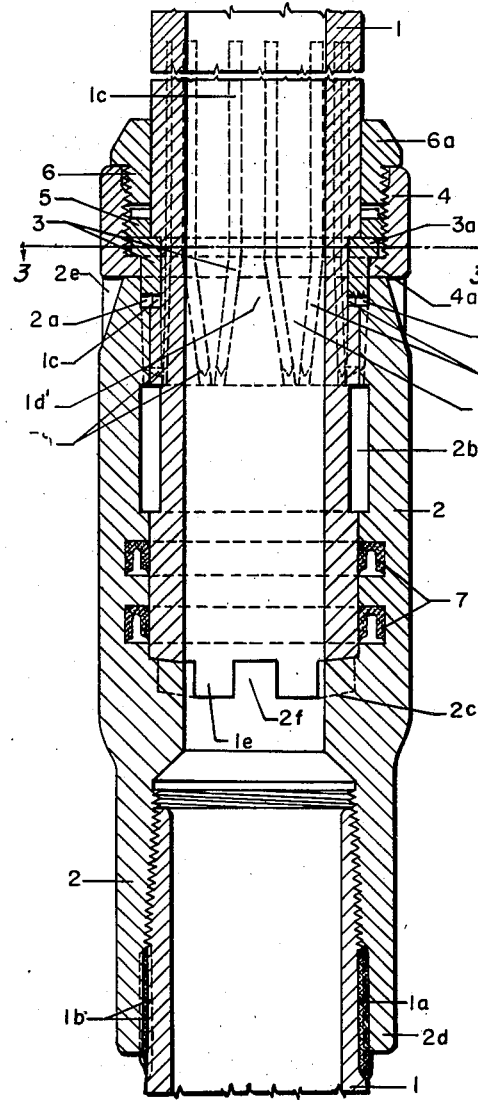
Fig. 2 is a longitudinal section through the preferred embodiment of this invention with two keys partially broken away to show slots.

In Fig. 2 the lower joint of drill pipe 1 is shown threadedly joined to coupling-shell 2 and secured therein by poured in babbitt 1a, the lands 1b in drill pipe and coupling-shell being enmeshed by and between the lands of the babbitt to prevent accidental unscrewing of the lower joint of the drill pipe. The tubular extension 2d and the lands 1b are of such length that the babbitt, or other low-fusing metal or alloy, will resist unscrewing of the drill pipe by a force somewhat greater than would be required to twist the drill pipe in two between its connections.

The upper joint of drill pipe 1 has a close slidable fit within the coupling-shell 2 and has its lower end engaged upon the circular shoulder 2c. Exterior of the upper joint of drill pipe 1 the slots 1c are disposed in pairs around its periphery. These slots are, preferably, parallel above the upper end of the coupling-shell 2 and below there these pairs of slots incline together, as appears in Fig. 2. All slots extend, at their lower ends, into the recess 2b, partially turned off of the exterior of the drill pipe and partially turned out of the interior of the coupling-shell when the pipe end is disposed in the shell as seen in Fig. 2. The inclined portion of slots 1c in the drill pipe are adapted to register with similarly inclined mating slots 2a in the coupling-shell. Within these mating slots, which are cut one-half of their depth within the drill pipe and cut the other half of their depth within the coupling-shell, the steel keys 3 are adapted to be received with slight clearance.

Figure 1:
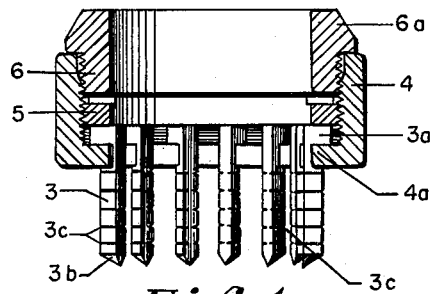
Fig. 1 is a longitudinal section through the removable connection means showing the parts of Fig. 2, assembled.
Figure 3:
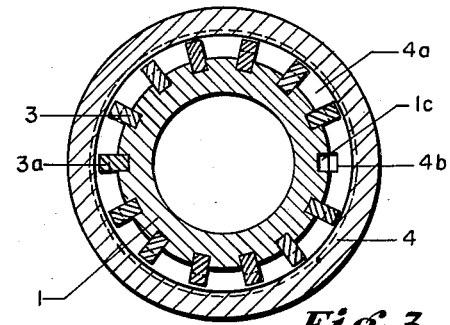
Fig. 3 is a cross section on the line 3—3, Fig. 2, with one key omitted to show the slots.

Fig. 1 shows the assembly of the keys separate from the complete assembly in Fig. 2. This assembly is provided that the keys may be placed as a unit into the position shown in Fig. 2 and that they may be withdrawn therefrom as a unit. In practice, however, the key assembly will be made upon the drill pipe as follows: The drive head 6, the key grip ring 5, and the key holder base 4, each having a free sliding fit over the drill pipe 1, will be, in the order named, slipped over the lower end of the drill pipe (then free from coupling-shell 2) with the lower end of member 4 positioned below the upper end of slots 1c by slightly more than the length of the keys 3, members 5 and 6 being pushed up out of the way for the time being. The keys will then be placed in the slots 1c of the drill pipe and shoved downward in them and into the slots 4b of the key holder base 4 (see Fig. 3) until the key heads 3a rest upon the annular flange 4a, the lower ends of the keys being still above the inclined lower portion of the slots. All keys being assembled within the parallel portion of the drill pipe slots 1c with the key heads resting upon the flange 4a, as stated, the grip ring 5, adapted to have threaded engagement within the upper end of base 4, is then screwed down firmly upon the heads 3a. The drive head 6, which also is adapted to have threaded engagement within the base 4, is screwed down until its enlarged end 6a firmly engages the upper end of base 4. The drill pipe is then inserted into the coupling-shell 2 until the lower end of the drill pipe rests upon the shoulder 2c. The key assembly may then be pushed or driven downward by force applied upon the drive head 6 until the base 4 rests upon the upper end of coupling-shell 2.

Figure 15:
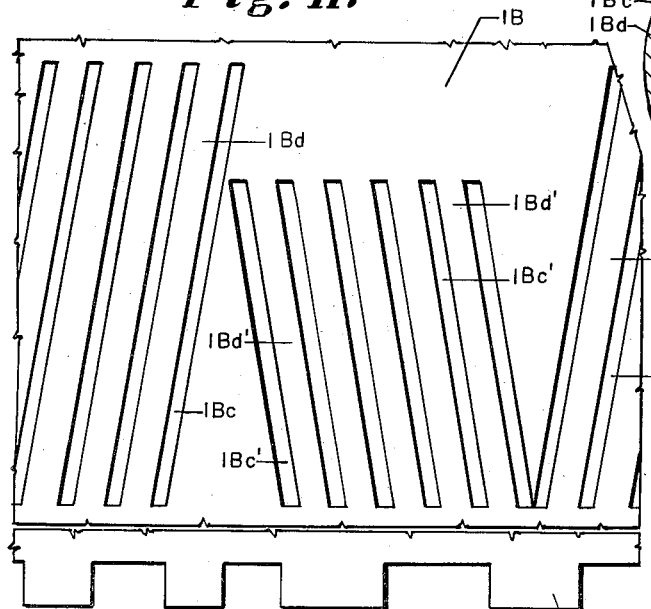
Fig. 15 is a rolled out view of a portion of the drill pipe showing the slots and lands of Fig. 9.

The lower end of the drill pipe 1 has depending projections 1e, adapted to enmesh with upstanding projections 2f of the coupling-shell, the projections 1e being of different widths so that they will enmesh with the projections 2f in only one position, that position being where the mating slots 1c of the drill pipe and 2a of the coupling-shell are opposite each other to receive the keys 3. In Fig. 15 the drill pipe projections 1Be, similar to the projections 1e in Fig. 2, are shown irregularly spaced as above specified. The pointed ends 3b of the keys will correct any slight imperfection in the registration of the mating halves of the slots in the members 1 and 2 as the keys are entering the slots in the coupling-shell and the inclined portion of the slots in the drill pipe. Slight clearance is provided between the adjacent sides of projections 1e and 2f in order to permit this, and to avoid extreme accuracy in enmeshing said projections. As the assembled keys are forced downward, they first travel with their outer halves uncovered in the parallel portion of the slots 1c, the lower deflected portion of these slots beginning at a level even with the top of coupling-shell 2. All of the slots 2a in the coupling-shell are deflected to exactly match the deflected portion of the slots 1c in the drill stem. In the operation of forcing the keys into the keyways, which are cut one-half in the drill pipe and the other half in the coupling-shell, the keys bend and follow the deflected slots, as appears in Fig. 2. The cuts 3c (which may or may not be employed) will lessen the bending force required to deflect the keys from the parallel slots 1c into the deflected lower portion of these slots, and, of course, will lessen the force required to withdraw the keys from these deflected slots.

The opening 2b, slightly wider than the keys, is turned one-half off of the drill pipe 1 and the opposite half is turned out of the coupling-shell 2. This opening, slightly longer than the distance between its upper end and the top of the member 2, is a trap for broken keys. If any of the keys which, preferably, are made of spring steel, should eventually fatigue and break off in the keyways between the drill pipe and coupling-shell, such broken keys can be driven into the recess 2b from which they may be recovered when the drill pipe is withdrawn from the coupling-shell.

The U-cups 7, which may be of leather or any other tough, yieldable substance, are adapted to be opened by pump pressure from below and will prevent any leakage of pump fluid which may attempt to escape through the slight clearance between the drill stem and coupling-shell. V-packing, or any other suitable substance, of course, may be substituted for the U-cups.

It will be observed in Fig. 2 that the triangular lands 1d and 1d' are formed between the slots in both the drill pipe 1 and coupling-shell 2. These lands, coacting with the deflected keys, hold the drill pipe together and, at the same time, coact with the enmeshed projections 1e and 2f to resist independent rotation of the drill pipe and coupling-shell, thus enabling the drill pipe to be rotated in either direction. While the drill pipe, coupling-shell, and keys are assembled, as in Fig. 2, every key 3 within the deflected slots in the drill pipe and coupling-shell and the enmeshed projections 1e and 2f would have to be sheared before the drill pipe and coupling-shell could be rotated in either direction independently of each other (see Figs. 2 and 3).

When no force is operating to pull the drill pipe and coupling-shell apart, the keys can be forced into the deflected slots 1c and 2a by the application of only enough force to deflect the keys and overcome the slight resulting friction. Likewise, if no force is operating to pull the drill pipe and coupling-shell apart, the keys may be readily withdrawn by approximately the same force as would be required to insert them. But the moment any force is applied to pull the drill pipe and coupling-shell apart, the triangular lands 1d and 1d' of the drill pipe and coupling-shell will immediately impinge the keys between them, and, consequently, the keys would have to be sheared for their length before the drill pipe and coupling-shell could be pulled apart. Twelve keys, for example, each 3″ long by ¼″ square, would require more force to so shear them than would be required to pull in two the strongest standard sizes of drill stem.

It will be noted that, to insert the drill stem into the well or to withdraw it therefrom, the standard practice is to set the coupling-shell 2 down upon an elevator, which would thus place a gravity parting strain upon all joints below and thereby cause the keys to lock, while the joint or joints in the unit being added or withdrawn above the elevator rest upon the shoulder 2c and free from all parting strain between the drill pipe and coupling-shell. It is thus apparent that the keys lock the joints together below the connection being made or broken out; while the joint at such connection is free from all strain that would resist the insertion or withdrawal of the keys.

Reversing the operation of inserting the keys, as stated and shown for Fig. 2, the same may be instantly and easily withdrawn by applying a special lifting tool, such as a quick-acting jack, into the angular cuts 2e which cuts afford access to the under side of key holder base 4. By raising this base the keys are withdrawn with their assembly which is forced upward over the drill pipe where it remains until the next assembly of the drill pipe and coupling-shell is to be accomplished, as hereinbefore described.

Preferably, a connection means such as shown in Fig. 2 should be provided for each joint of drill pipe, thus eliminating the use of tool joints and adding greater strength to the connections, as well as allowing greater speed and less danger in making up or breaking out the drill stem. A great percentage of all accidents on rotary drilling rigs result from the great force frequently required to connect and disconnect the drill stem. The slight force required to assemble the connection shown in Fig. 2 by pressing or driving down the head 6 and the slight force required to lift the keys by jacking up the base 4, means safety where danger has heretofore existed.

Figs. 4, 5, 6, 7 and 8 illustrate the first modified form of this invention. The lower joint of drill stem 1A may be threaded into the coupling-shell 2A and further secured to it by weld 1Aa. The upper joint of drill pipe 1A is closely slidable within the coupling-shell 2A and has its lower end engaged upon the internal shoulder 2Ac. The U-cups 7A, which may be of leather or other tough, expansible substance, adapted to be expanded by fluid pressure from below, will prevent any leakage of pump fluid between the drill stem and coupling-shell. Obviously, V-packing, or the like, may be employed in place of the U-cups.

Figure 4:
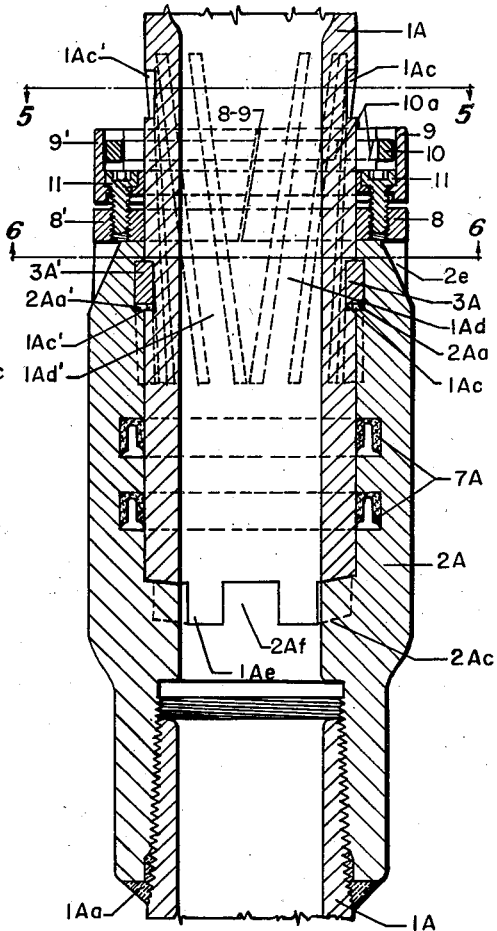
Fig. 4 is a longitudinal section through the first modified form of this invention.
Figure 6:
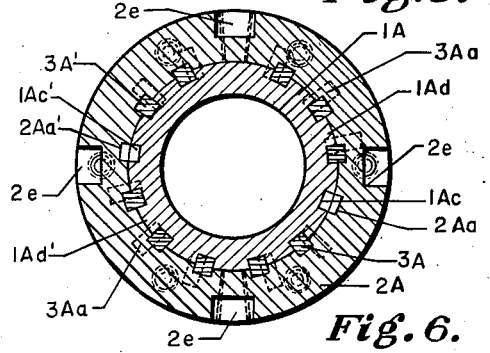
Fig. 6 is a cross section on the line 6—6, Fig. 4, with two keys omitted.

Exterior of the drill pipe one-half of the inclined slots 1Ac are grouped together and inclined in one direction and the other half of said slots 1Ac' are grouped together and inclined in the opposite direction. The inclined slots 2Aa and 2Aa' within the coupling-shell, Figs. 4 and 6, are likewise arranged in two groups and adapted to mate with the lower portion of the slots 1Ac and 1Ac' of the drill pipe (see Fig. 6) which shows the mating of the slots and keys. All slots in the drill pipe and all slots in the coupling-shell are slightly wider than the keys 3A and each of said slots is slightly deeper than one-half of the thickness of the keys, which thus have a free slidable fit within the slots. The slots on the drill pipe are somewhat more than twice as long as the keys in order that the keys may be assembled in units upon the drill pipe, as will be explained later.

Figure 5:
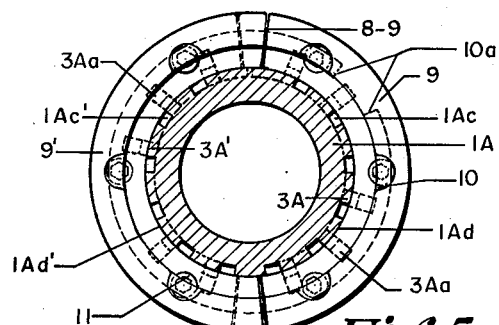
Fig. 5 is a cross section on the line 5—5, Fig. 4, with two keys omitted.
Figure 7:
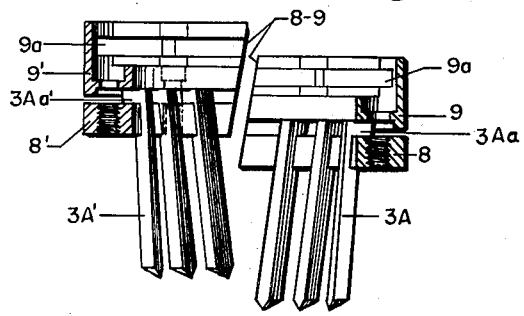
Fig. 7 is a longitudinal section through the two halves of the removable connection means wherein the parts of Fig. 4, are partially assembled.

The keys 3A and 3A' are mounted in two oppositely positioned assemblies, each assembly containing all the keys adapted to mate with the slots which incline in one direction and the other assembly containing all of the keys adapted to mate with the slots which incline in the other direction. Each set of keys are pre-shaped to incline in the same direction as the slots into which they are engageable, as appears in Fig. 7, wherein partial assemblies are shown for illustration, the actual assemblies being made upon the drill pipe as follows: The half key base 8 is placed against the drill pipe opposite the slots 1Ac. The keys 3A are then placed within the slots 1Ac above the base 8 and slipped downward in the slots until the key heads 3Aa land upon the half base 8. The half ring 9 is then placed upon the key heads 3Aa and clamped upon them by key assembling studs 11 which studs have threaded engagement with the half base 8. The other half base 8' is then placed upon the drill pipe opposite the slots 1Ac'. The keys 3A' are then placed within the slots 1Ac' above the half base 8', both half bases 8 and 8' having internal slots which receive the keys for one-half of their depth, as appears in Fig. 7. The half ring 9' is then placed upon the key heads 3Aa' and clamped upon them by studs 11, having threaded engagement with the half base 8'. Each assembly of keys will remain upon the drill pipe because the end keys of each assembly are embedded within slots almost on opposite sides of the pipe from each other. Now, to accomplish the connection between the drill pipe and coupling-shell, one key assembly is pressed downward until its base rests upon the upper end of member 2A. Then the other key assembly is pressed downward until its base likewise rests upon the upper end of coupling-shell 2A. The inclined surfaces 8—9, Figs. 4, 5, and 7, are for the purpose of permitting a comparatively close joint between the two halves of the key assembly as the last one applied goes to place with a slight rotary movement. The snap ring 10, having a portion cut out at 10a to enable the ring to be compressed to a somewhat smaller diameter, is then inserted into an internal circular recess 9a, Fig. 7, of the clamp ring halves 9 and 9', to hold the two halves together in which position they cannot be removed. This completes the connection between the drill pipe and coupling-shell, which cannot then be pulled apart or rotated independently of each other.

Figure 8:
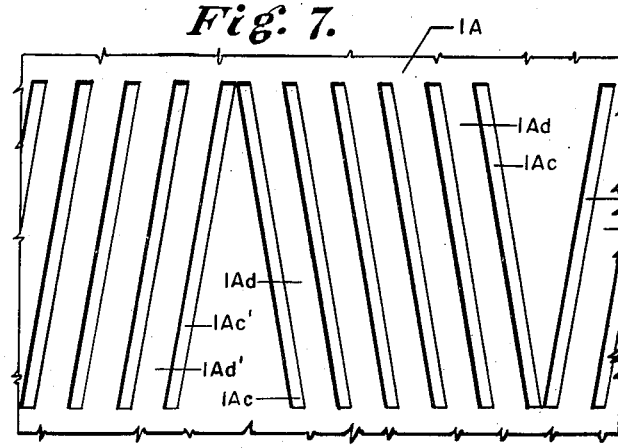
Fig. 8 is a rolled out section of the drill pipe showing the slots and lands of Fig. 4.

The lower end of the drill pipe 1A has depending projections 1Ae, Fig. 4, adapted to enmesh with upstanding projections 2Af, the projections 1Ae being of different widths so that they will enmesh with the projections 2Af in only one position; that position being where the mating slots 1Ac of the drill pipe and 2Aa of the coupling-shell are opposite each other to receive the keys 3A and where the slots 1Ac' of the drill pipe and 2Aa' of the coupling-shell are also opposite each other to receive the keys 3A', see Fig. 15, in which the drill pipe projections 1Be are similar in their irregular width and spacing to the projections 1Ae in Fig. 4. In Fig. 6 it will be observed that all keys 3A and 3A' and the enmeshed projections 1Ae and 2Af of the drill pipe and coupling-shell would have to be sheared before independent rotation between the drill pipe and coupling-shell could be accomplished. In Figs. 4 and 8 the two groups of slots 1Ac and 1Ac' within which are slidably engaged the two assemblies of keys 3A and 3A', clearly show that the group of keys 3A will be locked against the lands 1Ad and the other group of keys 3A' will be locked against the lands 1Ad' if it be attempted to withdraw the drill pipe from the coupling-shell. It is apparent that no such withdrawal can be accomplished without shearing all of the keys. If, for example, 12 keys, each 3″ long by ¼″ square stock, be employed, much more force would be required to shear the keys than the force which would pull the strongest drill pipe in two intermediate of the connections.

The assembly of the drill pipe and coupling-shell being accomplished, as stated, if it be desired to disconnect this assembly, all that will be necessary is to remove the snap ring 10 and lift out both key assemblies, one assembly of keys, of course, being removed first and then the other. Each assembly of keys having their keys bent to conform to the spiral slots into which they are engaged, it is apparent that each of such key assemblies may be placed in the position shown in Fig. 4 by slight force applied above either of them and that either of them can be removed therefrom by the application of very slight force under the key bases 8 or 8'. The angular cuts 2e give ready access for the application of such lifting force. As stated for the preferred embodiment of this invention, the key slots do not exert a shearing force upon the keys until a force is applied tending to pull the pipe and coupling-shell apart. Consequently, this shearing force is always absent during the assembly or disconnection of the drill pipe and coupling-shell, and is always present after the connection is made and the weight of the drill pipe is carried upon the elevator under the coupling above as per the usual practice for inserting drill pipe into a well or withdrawing it therefrom.

As stated for the preferred embodiment, if the construction shown in Fig. 4 be employed, it is desirable to connect all of the drill pipe joints by that means which also avoids the use of tool joints and enables the drill stem to be rotated either clockwise or anti-clockwise without the danger of unscrewing or galling threads and with less danger to the drilling screw than where threaded connections are employed.

Figure 9:
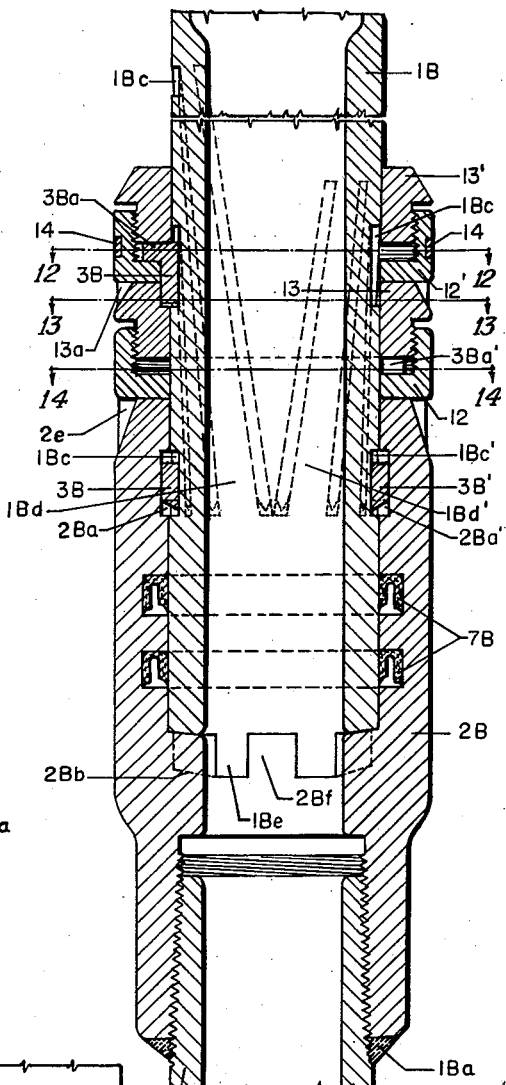
Fig. 9 is a longitudinal section through the second modified form of this invention with one key partially broken out.
Figure 10:
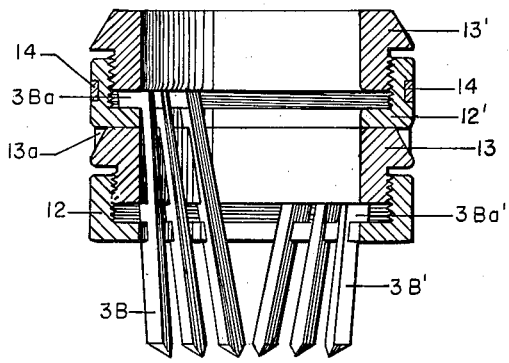
Fig. 10 is a longitudinal section through the two halves of the removable connection means employed in Fig. 9.
Figure 11:
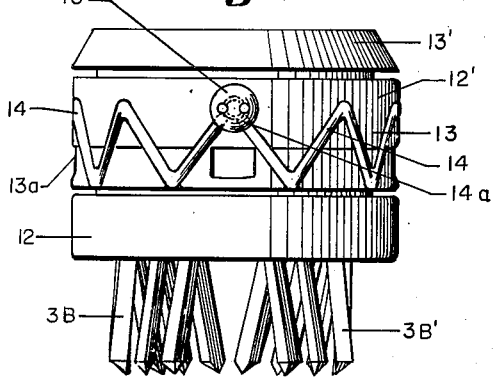
Fig. 11 is an outside view of the removable connection means employed in Fig. 9 and shown sectionized in Fig. 10.
Figure 12:
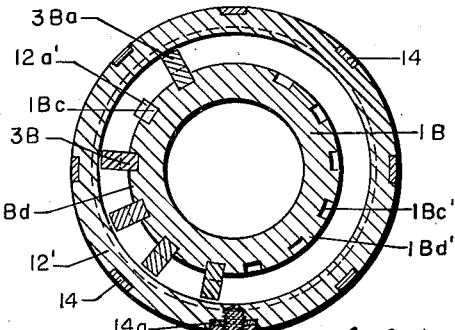
Fig. 12 is a cross section on the line 12—12, Fig. 9.
Figure 13:
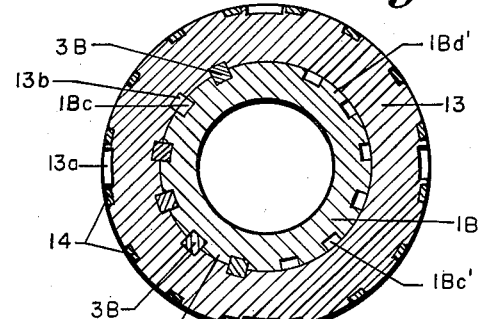
Fig. 13 is a cross section on the line 13—13, Fig. 9, with one key omitted.
Figure 14:
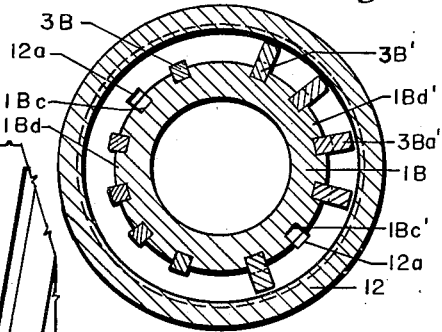
Fig. 14 is a cross section on the line 14—14, Fig. 9, with two keys omitted.

The second modified form of this invention is illustrated in Figs. 9 to 15, both inclusive. In Fig. 9 the lower joint of drill stem 1B has threaded connection into coupling-shell 2B to which it may be further secured by weld 1Ba. Within the coupling-shell the upper joint of drill stem 1B is closely slidable and seats upon the internal shoulder 2Bb. The U-cups or packing 7B, corresponding to the similar cups 7 in Fig. 2 and 7A in Fig. 4, prevent leakage of the pump fluid between the drill pipe and coupling-shell, as was stated for the preceding forms. The exterior of the drill pipe has two groups of parallel slots, each group being oppositely inclined, as appears in Figs. 9 and 15. The slots 1Bc of one group are longer than the other group 1Bc'. Each of these slots has a depth of slightly more than one-half the thickness of the keys 3B and 3B', each slot is slightly wider than each of said keys. Within the coupling-shell 2B there are two other groups of oppositely inclined slots extending from the upper end of the coupling-shell. These groups of slots are of the same width and depth as the slots in the drill pipe and mate therewith to receive the keys 3B and 3B' which keys, pre-shaped to fit the spiral form of the slots, have a close sliding fit therein. The shorter keys 3B' and the longer keys 3B are mounted in two separate assemblies (see Figs. 10 and 11), both of which fit over the drill pipe; one assembly being positioned above the other and the upper assembly having its keys passed through the lower assembly. One assembly of keys has its keys inclined in one direction and the other assembly has its keys inclined in the opposite direction, the keys of each assembly having equal length of engagement within the mating group of slots in the coupling-shell. Both assemblies of keys are shown in Figs. 10 and 11 for illustrative purposes only, as the actual assemblies are made upon the drill stem, as follows: To mount the upper assembly, the upper clamp ring 13' and the upper key base 12', in the order named, are slipped over the lower end of the upper drill pipe joint, the member 12' being stopped somewhat below the upper end of slots 1Bc while the member 13' is pushed further upward out of the way. The long keys 3B are then placed in the slots 1Bc of the drill pipe and pushed downward therein through the slots 12a' of the upper key base 12' until the key heads 3Ba rest upon the upper key base. The upper clamp ring 13' which is adapted to have threaded engagement within the member 12' is then screwed down firmly upon the key heads 3Ba. The lower assembly of keys is then similarly mounted by slipping the lower clamp ring 13 and lower key base 12 over the lower end of the drill pipe in the order named. The member 13 is shoved upward out of the way and the short keys 3B are placed within the slots 1Bc' and pushed downward in them through the slots 12a of the lower key base 12 until their heads 3Ba' rest upon the lower key base. The lower clamp ring 13, which is adapted to have threaded engagement within the member 12, is then screwed down firmly upon the heads 3Ba' of the keys 3B' completing this assembly of the shorter keys. Both units of keys being mounted upon the upper joint of drill pipe, as stated, the drill pipe is lowered into the coupling-shell 2B with its lower end resting upon the internal circular shoulder 2Bb. The lower assembly of keys is then pressed downward followed by the upper assembly, the keys of which assembly pass through slots 12a and 13b upon the inside of the members 12 and 13, respectively, as appears in Figs. 10, 13 and 14. The angle wire 14, which, preferably, should be of spring steel, is then fitted into a conforming recess upon the periphery of both key assemblies, as appears in Fig. 11. The ends 14a of the angle wire, which are of reduced thickness, are then secured by locking stud 15, as appears in the section, Fig. 12, the outside view being shown in Fig. 11. The position of all parts in the joint will then be as shown in Fig. 9.

Figs. 10 and 11 show the oppositely inclined keys 3B and 3B' which correspond in their deflection to the direction of the slots 1Bc and 1Bc', respectively, in the drill pipe and their mating slots 2Ba and 2Ba', respectively of the coupling-shell (see Fig. 9, also Fig. 6 for similar construction). Fig. 15, showing the slotted portion of the drill pipe rolled out, clearly shows the oppositely inclined groups of slots and how they will be engaged by the assemblies of keys in Figs. 9 and 11.

The lower end of the drill pipe 1B has depending projections 1Be, Fig. 9, adapted to enmesh with the upstanding projections 2Bf of the coupling-shell 2B, the projections 1Be being of different widths (see Fig. 15) so that they will enmesh with the projections 2Bf in only one position; that position being where the mating slots 1Bc of the drill pipe and 2Ba of the coupling-shell are opposite each other to receive the long keys 3B and where the slots 1Bc' of the drill pipe and 2Ba' of the coupling-shell are opposite each other to receive the short keys 3B'.

It is apparent in Figs. 9, 12, 13, and 14 that all of the keys 3B and 3B' and the enmeshed projections 1Be and 2Bf of the drill pipe and coupling-shell would have to be sheared before independent rotation of the drill pipe and coupling-shell could be accomplished. As stated for the preceding embodiments, the drill stem would twist off between the connections before this would happen. It is also apparent that the drill pipe would pull in two between the connections before the keys impinged between the lands 1Bd and 1Bd' of the drill pipe and their opposite lands in the coupling-shell would be sheared by pulling upon the pipe, as was stated in connection with the two preceding embodiments.

In order to disconnect the joint made, as in

Fig. 9, proceed in the following order: (1) Loosen stud 15, (2) remove angle wire 14, (3) force the upper assembly of keys upward out of their mating slots in the drill pipe and coupling by applying the necessary lifting force under the member 13, the angle slots 13a being to afford access for this purpose, (4) force the lower assembly of keys upward out of their mating slots in the drill pipe and coupling by applying necessary lifting force under the member 12, the angle slots 2e being to provide access for this purpose. The drill pipe may now be lifted out of the coupling-shell, and, while so removed, the assemblies of keys will remain upon the drill pipe in readiness to be again applied, as hereinbefore stated, when it is desired to repeat the connection, as shown in Fig. 9.

If the construction shown for the second modified form of this invention be employed, preferably, each joint in the drill stem should be made as in Fig. 9; and if the drill stem be so connected, it will accomplish all of the purposes set out for the preceding embodiments.

Obviously, each embodiment of this invention may be employed for pipe unions and as a means for connecting shafts together. Where the word "pipe" is employed in the claims herein, it is therefore intended that shafts, rods, staffs and the like are included. Employed as a pipe union, the enmeshed projections, such as 1e and 2f of Fig. 2, may be omitted and an expanding ring may be placed within the U-turn of the U-cups to make them more sensitive in preventing low pressure leaks. Packing may also be placed between the even end of the pipe and the smooth shelf upon which the pipe engages (the enmeshing lands, such as 1e and 2f in Fig. 2, being omitted, as stated, in forming a union).

The means shown in the foregoing embodiment of this invention wherein keys and keyways are substituted for the usual threads and wherein the rotary thrust, which may be in either direction without danger of the joints becoming disconnected, is borne by enmeshed projections and embedded keys, while compression and expansion strains are eliminated by the same means which also minimize galling and crystallization, while at the same time affording more strength and speed in operation than threads afford, together with the elimination of tool joints and the employment of great force in making and breaking the connections and the employment of replaceable U-cups or packing for the prevention of leaks, are believed to have shown and described means for accomplishing all of the first stated objects. Manifestly, this invention is subject to many minor changes and substitutions in construction, which will remain within the scope of the stated objects and appended claims, and I reserve the right to make such changes and substitutions.

I claim:

1. A pipe connection of the character described comprising a pair of non-rotatably interfitting pipe ends, and means to hold said ends against axial movement comprising a plurality of keyways formed partially on one pipe end and partially within the other pipe end, said keyways being inclined relative to each other, and keys disposed in said keyways to lock said ends against longitudinal movement due to the inclination of said keyways.

2. A pipe connection of the character described comprising a pair of non-rotatably interfitting pipe ends, and means to hold said ends against axial movement comprising a plurality of keyways formed partially on one pipe end and partially within the other pipe end, said keyways being inclined relative to each other, and keys disposed in said keyways to lock said ends against longitudinal movement due to the inclination of said keyways, and means to hold said keys in said ways.

3. A pipe connection of the character described comprising a pair of non-rotatably interfitting pipe ends, and means to hold said ends against axial movement comprising a plurality of keyways formed partially on one pipe end and partially within the other pipe end, said keyways being inclined relative to each other, and keys disposed in said keyways to lock said ends against longitudinal movement due to the inclination of said keyways, and means to hold said keys in said ways including a split head construction.

4. A drill pipe connection including a pipe section, a shell member fixed thereto, a recess in said shell member, slotted areas in said recess, a pipe end, slots on the periphery of said end, said slots being axially arranged for a part of their length and relatively inclined for a part of their length, keys to be inserted in the axial part of the slots and slipped into the inclined part of the slots, and means to lock said keys together as a unit.

5. A drill pipe connection including a pipe section, a shell member fixed thereon, a pipe end non-rotatably interfitting said shell, matching inclined slots on said end and in said shell, keys to fit in said slots, and means to hold said keys together as a unit so as to resist axial thrust.

6. A drill pipe connection including a pipe section, a shell member fixed thereon, a pipe end non-rotatably interfitting said shell, matching inclined slots on said end and in said shell, keys to fit in said slots, and means to hold said keys together as a unit so as to resist axial thrust including a base ring.

7. A drill pipe connection including a pipe section, a shell member fixed thereon, a pipe end non-rotatably interfitting said shell, matching inclined slots on said end and in said shell, keys to fit in said slots, and means to hold said keys together as a unit so as to resist axial thrust including a base ring and a hold down ring and studs to hold said rings together.

8. A drill pipe connection including a pipe section, a shell member fixed thereon, a pipe end non-rotatably interfitting said shell, matching inclined slots on said end and in said shell, keys to fit in said slots, and means to hold said keys together as a unit so as to resist axial thrust said keys being of different lengths.

ALEXANDER BOYNTON.